United States Patent [19]
Davis et al.

[11] Patent Number: 5,832,902
[45] Date of Patent: Nov. 10, 1998

[54] FUEL TEMPERATURE CONTROL BYPASS CIRCUIT

[75] Inventors: Stephen D. Davis; Paul B. Smith, both of Ann Arbor, Mich.

[73] Assignee: Davco Manufacturing L.L.C., Saline, Mich.

[21] Appl. No.: 857,209

[22] Filed: May 15, 1997

[51] Int. Cl.⁶ .................................................. F02M 37/00
[52] U.S. Cl. ........................... 123/514; 123/557; 123/516
[58] Field of Search .................... 123/557, 514, 123/509, 516, 510

[56] References Cited

U.S. PATENT DOCUMENTS

| | | | |
|---|---|---|---|
| 3,768,454 | 10/1973 | Markland | 123/122 |
| 4,231,342 | 11/1980 | Johnston | 123/557 |
| 4,320,734 | 3/1982 | Balachandran | 123/514 |
| 4,320,736 | 3/1982 | Sharon | 126/19 |
| 4,326,492 | 4/1982 | Leibrand | 123/514 |
| 4,377,149 | 3/1983 | Naylor | 123/510 |
| 4,428,351 | 1/1984 | Davis | 123/557 |
| 4,454,848 | 6/1984 | Duprez | 123/514 |
| 4,454,851 | 6/1984 | Bourbonnaud | 123/557 |
| 4,473,054 | 9/1984 | Marcoux et al. | 123/557 |
| 4,617,116 | 10/1986 | Seiler | 123/514 |
| 4,618,417 | 10/1986 | Yamanouchi | 210/149 |
| 4,850,327 | 7/1989 | Fayard | 123/557 |
| 4,933,093 | 6/1990 | Keller | 123/557 |
| 5,048,292 | 9/1991 | Kubik | 60/413 |
| 5,085,198 | 2/1992 | Bartlett | 123/557 |
| 5,156,135 | 10/1992 | Snyder | 123/557 |
| 5,423,373 | 6/1995 | Ramberg | 165/1 |
| 5,507,942 | 4/1996 | Davis | 210/94 |

*Primary Examiner*—Carl S. Miller
*Attorney, Agent, or Firm*—Young & Basile, P.C.

[57] ABSTRACT

A unitary temperature control bypass and fuel filtering device for an engine for heating fuel in the fuel filter. The device has an entry passage for receiving excess fuel from the engine, a first outlet passage for communicating with the fuel tank and a second outlet passage directing heated fuel into the fuel filtering device and then terminating in the first outlet passage. A central chamber communicating with the entry and outlet passages is centrally located between the passages and has a piston therein having reciprocal movement between the outlet passages for selectively blocking one of the outlet passages, wherein the piston is responsive to the fuel temperature in the filtering device.

12 Claims, 3 Drawing Sheets

FUEL TEMPERATURE CONTROL BYPASS CIRCUIT

FIELD OF THE INVENTION

This invention relates to a heat recovery and control system for a diesel fuel engine.

BACKGROUND OF THE INVENTION

Cold weather creates an operational problem for diesel fuel engines. Diesel fuel has a tendency to form a wax-like substance when exposed to cold weather such that it can clog the fuel line and engine to impair driveability. In severe cases, the engine may be damaged as well as other components such as the pump and rubber hoses.

Various attempts and methods have been employed to overcome these problems. Some methods and devices of the prior art include using a heat exchanger to heat the fuel so that wax crystallization is avoided. This method has the disadvantage of requiring a significant period of time before the fuel is heated. Another method includes mixing fuel from the fuel tank with excess fuel from the engine to warm the input fuel into the engine. Further, another method incorporates using coolant water to enter the fuel filter and thereby warming the fuel as it circulates the fuel filter before entering the engine. The disadvantage of this method is that extra plumbing is required to move the coolant fluid into and through the fuel filter for access to the fuel.

SUMMARY OF THE INVENTION

It is the intent of the invention to address these aforementioned problems. The invention relates to a heat control system for fuel filters on a diesel vehicle and especially a system that uses the excess return fuel as a heating fluid. The heating apparatus is attached and is integral with a fuel filter, and configured so that an upper U-shaped portion of the heating apparatus extends into the filter. When the fuel is needed to heat the fuel, a bypass circuit is positioned to allow the return fuel to flow adjacent the fuel in the fuel filter through the U-shaped portion. If the fuel temperature is outside of a predetermined temperature for use, the bypass circuit actuated by a wax motor driven piston, shuts off flow of return fuel to the fuel filter and circulates it directly back to the fuel tank.

The use of return fuel as a heater for the fuel filter is superior as a heating fluid in certain types of fuel injection systems in comparison to the use of coolant. Return fuel absorbs heat more quickly than the engine coolant. Return fuel also has a higher end temperature than engine coolant, which has a regulated end temperature. Additionally, the use of return fuel allows the use of extending an existing line in the vehicle compared to running two additional water hoses when using coolant to heat the fuel filter. The bypass circuit can be used with any heated fluid, but is necessary if using return fuel so that the return fuel is sent back to the fuel tank.

Other objects, advantages and applications of the present invention will become apparent to those skilled in the art when the following description of the best mode contemplated for practicing the invention is read in conjunction with the accompanying drawings.

DESCRIPTION OF THE PREFERRED EMBODIMENT

Figure 1:
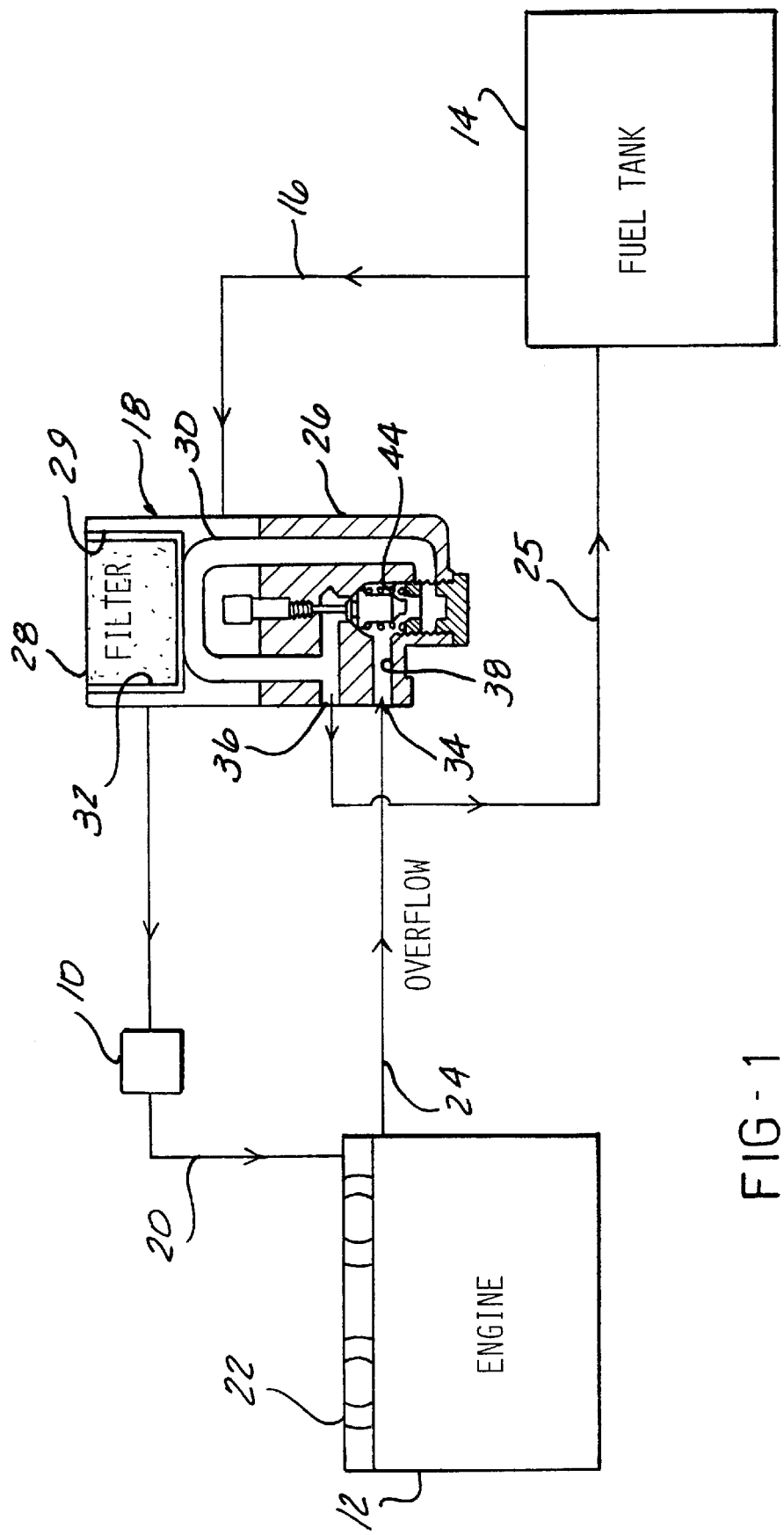
FIG. 1 is a schematic diagram of a fuel system incorporating a fuel heating apparatus integral with the fuel filter as described in the invention.
Figure 3:
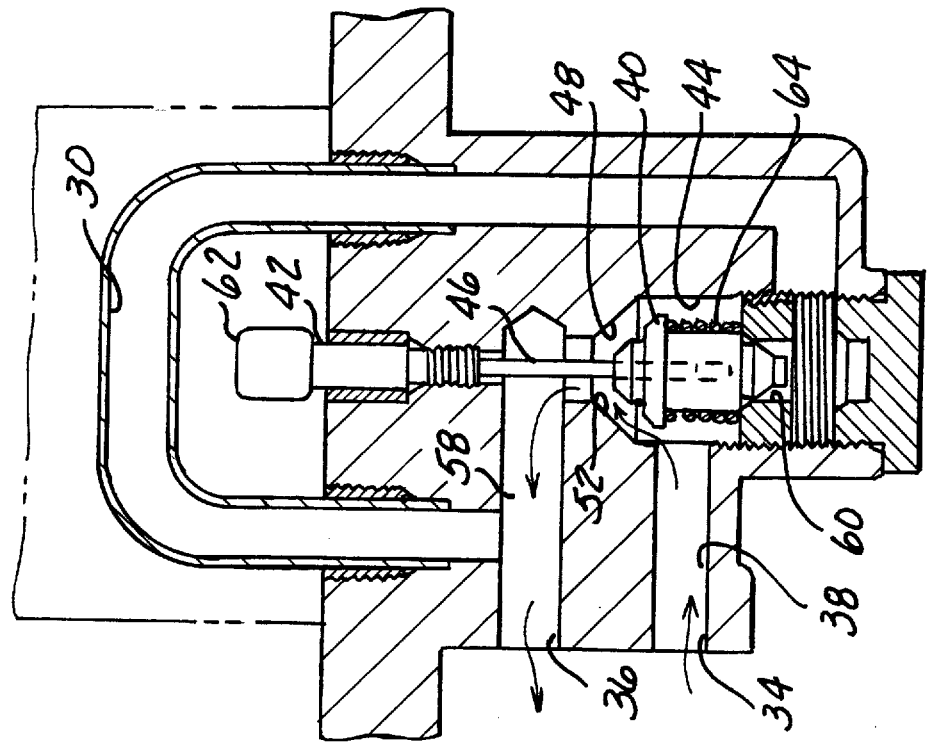
FIG. 3 is a vertical sectional view of the fuel filter and the integral heater apparatus in the bypass mode.
Figure 2:
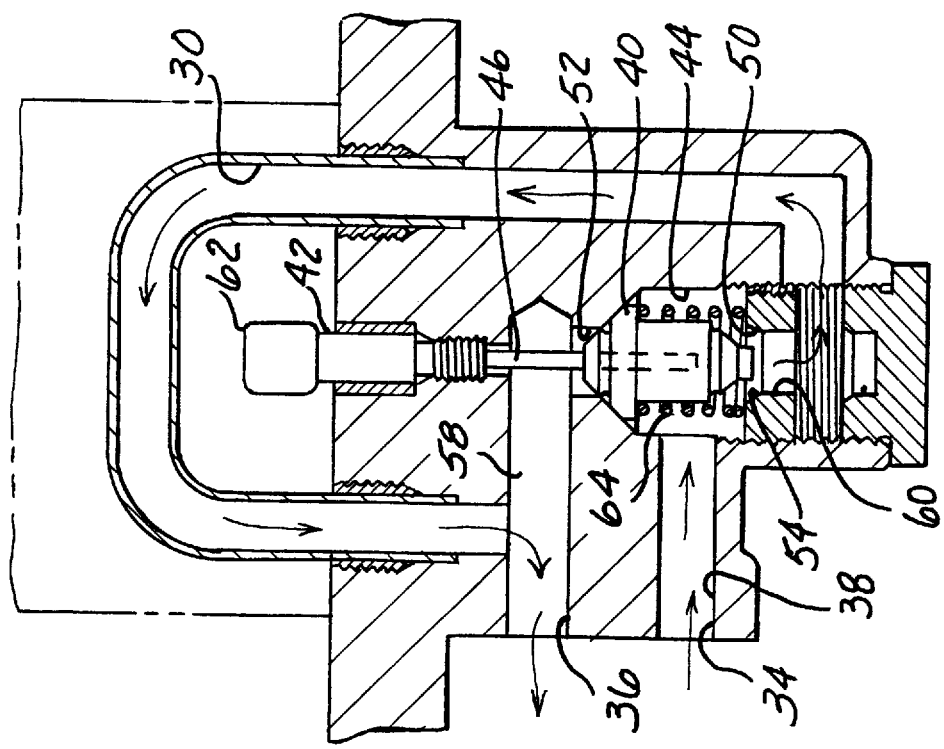
FIG. 2 is a vertical sectional view of a fuel filter having the integral heating apparatus in the heating mode.

Referring to the drawings, the present invention will now be described in detail with reference to the illustrated embodiments. FIG. 1 shows a typical fuel delivery system incorporating the present invention. In a vehicle, a fuel pump 10 of an engine 12 draws the diesel fuel from a fuel tank 14. The fuel is pumped under pressure from the fuel tank 14 through a supply line 16 leading to the combination fuel filter and heating apparatus 18. The fuel is filtered in the upper portion 28 of the combination fuel filter and heating apparatus 18. From the combination apparatus 18, the fuel is then transported through an inlet line 20 to the manifold 22 of the engine 12. Further components of the engine 12 are known in the art and therefore not shown. Unused fuel is returned to the fuel tank 14. In the present invention, the unused or excess fuel first flows through a return conduit 24 to a lower portion 26 of the combination apparatus 18. The excess fuel has been preheated in the manifold 22. If the temperature of the fuel in the fuel filter is below a predetermined set value, the heated excess fuel is used to flow through a portion of the combination fuel filter and heating apparatus 18 to heat the fuel in the upper portion 28 of the combination apparatus 18 before it flows to the manifold inlet 22 and engine 12. The excess fuel then continues through return conduit 25 to the fuel tank 14. If the temperature of the fuel at the fuel filter is at least the predetermined set temperature or greater, then the excess fuel is cycled directly back to the fuel tank 14.

FIGS. 2–5 illustrate the reconfigured combination fuel filter and heating apparatus 18 of the present invention. The upper portion 28 of the combination apparatus 18 is similar to conventional fuel filters of the prior art in which there is located a cavity 29 for holding a filter cartridge 32. The upper portion 28 of the combination apparatus 18 has inlet and outlet pods (not shown) to direct the fuel into the upper portion 28 from supply line 16, through the filter cartridge 32 and through the outlet port to the inlet line 20 for flow into the manifold 22 of engine 12.

The lower portion 26 of the combination apparatus 18 is the improvement to the existing fuel filter in that a conduit 30 extends adjacent the filter cartridge 32 to carry the heated excess fuel proximate to the filter cartridge 32 to heat the fuel therein. The lower portion 26 of the fuel filter will be detailed hereinafter.

The lower portion 26 of the combination fuel filter and heating apparatus 18 as shown in FIGS. 2–5 is integral with the upper portion 28 of the filter to provide a unitary fuel heating and filtering unit 18. The lower portion 26 includes an inlet 34 and outlet 36 port through which all of the excess fuel from the engine 12 flows before flowing back into the fuel tank 14. The inlet port 34 opens to a passage 38 that terminates at a central chamber 44. From the small central chamber 44 are a pair of outlet passages. The first outlet passage 58 leads directly to the outlet port 36 that communicates with a conduit 25 leading back to the fuel tank 14. The second outlet passage 60 continues through a conduit 30 that extends into the upper fuel filter portion 28. Conduit 30 is formed as a U-shaped tube. This U-shaped tube 30 that extends adjacent the fuel in the cavity 29 in the upper portion 28 defines the heating element. The U-shaped tube 30 returns to the lower portion 26 of the combination apparatus 18 such that the conduit 30 of the U-shaped tube intersects the outlet passage 58 proximate the outlet port 36 so that the fuel flows out the outlet port 36 and back into the conduit 25 leading to the fuel tank 14.

The passageway that the fuel takes once leaving the small central chamber 44 is determined by a wax motor assembly. The heating circuit is controlled by a temperature responsive piston 40. A wax motor assembly 42 and its piston 40 are configured and arranged for movement within the central chamber 44 for blocking one passage 58 or the other passage 60 dependent upon the temperature of the fuel in cavity 29. The piston 40 has reciprocal movement within the central chamber 44 between a first seat 48 and a second seat 50 at opposing ends of the chamber 44. The first seat 48 provides an entry port 52 to the first outlet passage 58 for the excess fuel to bypass the upper portion 28 of the combination apparatus 18 and flow directly to the fuel tank 14. The second seat 50 provides an entry port 54 to outlet passage 60 for the fuel to flow through the U-shaped flow path or conduit 30 extending into the upper portion 28 of the fuel filter 18, thereby heating the fuel in the fuel filter 32 and cavity 29 before it goes to the engine 12.

The wax motor assembly includes a sensing end 62 that senses the temperature of the fuel in and adjacent to the fuel filter cavity 29. The wax motor assembly is threadably attached to the lower portion 26 of the combination apparatus 18. The sensing end 62 extends into the upper portion 28 of the combination apparatus 18 so that the temperature sensing end 62 is exposed to the fuel in the fuel filter. The sensing end 62 communicates with piston 40 through rod 46. The piston 40 is movable along the wax motor assembly rod 46 and moves between the first 58 and second 60 outlet passages to open and close one thereof. The piston 40 includes a spring 64 around the piston at one end portion to bias the piston 40 against seat 48 so that the first outlet passage 58 is normally closed. That is, the piston 40 is biased to open passage 60 to conduit 30 until the temperature of the fuel in the fuel filter reaches at least a predetermined set value. When the wax motor assembly determines that the fuel in the fuel filter has reached the specified temperature, the piston 40 moves against the second seat 50 of the second outlet passage 60 so that the excess and overflow fuel from the manifold is routed through the first outlet passage 58, without any flow routed adjacent the fuel cavity 29 and filter cartridge 32.

Figure 4:
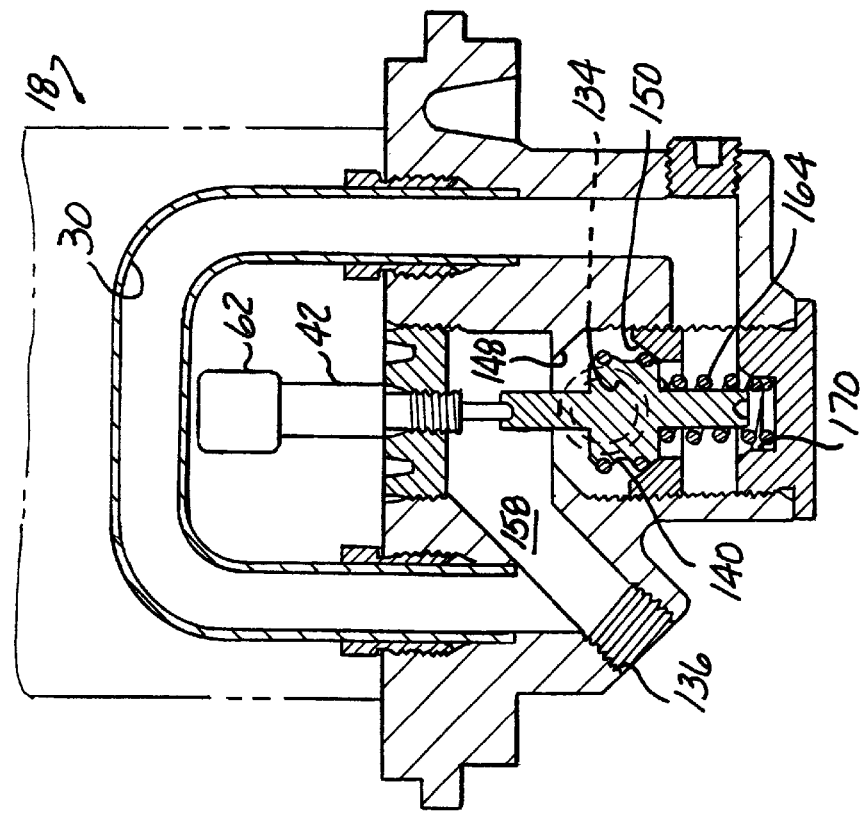
FIG. 4 is a vertical sectional view of a fuel filter showing an alternate embodiment of the integral heating apparatus in the heating mode.
Figure 5:
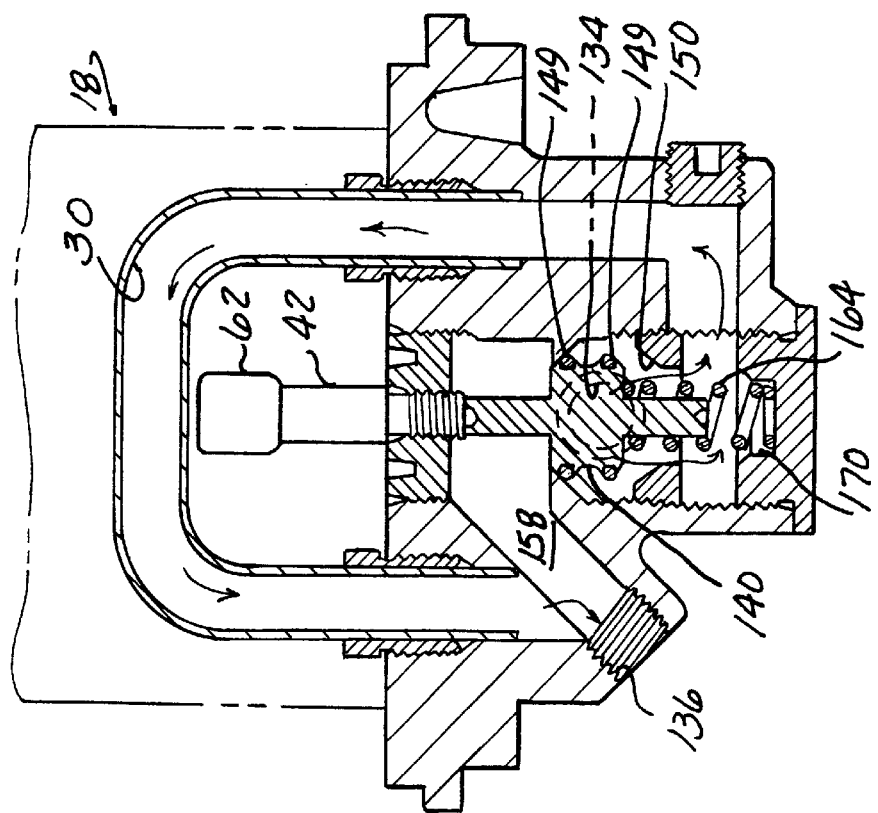
FIG. 5 is a vertical sectional view of the fuel filter showing the alternate embodiment of the integral heating apparatus in the bypass mode.

FIGS. 4 and 5 show a slightly different configuration of the combination fuel filter and heating apparatus 18. The concept of the embodiment in FIGS. 4 and 5 work the same way as in FIGS. 2 and 3. In this second embodiment, the inlet port 134 to the lower portion 26 of the apparatus 18 is shown at a 90° offset from the outlet port 136. In addition, the outlet passage 158 extends diagonally in a downward direction out of the apparatus 18. Further in the second embodiment the spring 164 is set in a cavity 170 and communicates with one end of piston 140. The spring 164 is biased so that piston 140 is seated against seat 148 and fuel flow is directed to conduit 30. This is shown in FIG. 4. Gaskets 149 prevent leakages when the piston 140 is seated against either seat 148 or 150. When the fuel attains the specified temperature, the piston moves against seat 150 to direct fuel through passage 158 and then directly to the fuel tank.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel temperature control bypass system for an engine having an inlet port for receiving fuel and an outlet port for returning excess fuel from the engine, said system comprising:

a fuel tank for containing a supply of fuel;

means for communicating fuel from the fuel tank to the inlet port of the engine;

a fuel filter disposed between the fuel tank and engine for receiving the fuel therein from the fuel tank and filtering said fuel before said fuel enters the inlet port of the engine;

means for communicating the excess fuel from the outlet port of the engine to the fuel tank;

means for sensing the temperature of the fuel in the fuel filter; and means for diverting all the excess fuel to flow adjacent the fuel filter, when the temperature of the fuel in the fuel filter is less than a specified temperature.

2. The bypass system of claim 1, wherein the diverting means is integral with the fuel filter.

3. The bypass system of claim 1, wherein the diverting means includes a flow path extending adjacent the fuel filter.

4. The bypass system of claim 1 wherein the diverting means includes an entry port for receiving the excess fuel from the engine and an exit port communicating with the fuel tank.

5. The bypass system of claim 4, wherein the temperature sensing means is disposed adjacent the fuel filter.

6. The bypass system of claim 5, wherein the temperature sensing means communicates with a piston, said piston having reciprocal movement for selectively opening and closing the flow path extending to the fuel filter.

7. A unitary fuel temperature control bypass and filtering device for an engine comprising a housing having an upper chamber for containing a fuel filtering means, and a lower portion for containing the fuel temperature control bypass, said bypass having an entry passage for receiving returning fuel from the engine and a first outlet passage and a second outlet passage, said first and second outlet passages communicating with said entry passage, a central chamber in fuel communication with the entry passage and the first and second outlet passages, said chamber disposed between said passages; a piston disposed in said chamber and having reciprocal movement between said first and second outlet passages for selectively blocking one of the outlet passages.

8. The device of claim 7, wherein said movement of said piston is responsive to the temperature of the fuel in the filtering means.

9. The device of claim 7, wherein said first outlet passage directs fuel through the bypass device and the second outlet passage includes an isolated flow path directing fuel adjacent to the filtering device.

10. The device of claim 9, wherein said movement of said piston is responsive to a wax motor.

11. The bypass system of claim 3, wherein the temperature sensing means directs the excess fuel to a bypass path communicating with the fuel tank when the temperature of the fuel in the fuel filter is greater than a specified temperature.

12. The bypass system of claim 11, wherein the flow path of the diverting means communicates with a downstream portion of the bypass path for returning all the excess fuel to the fuel tank.

* * * * *